United States Patent [19]
Dieso et al.

[11] Patent Number: 5,989,607
[45] Date of Patent: Nov. 23, 1999

[54] SPIRALLY SLICED HAM PRODUCT AND METHOD AND APPARATUS FOR PRODUCTION THEREOF

[75] Inventors: Stephen D. Dieso, Parkville, Mo.; David L. Fawcett, New Riegel, Ohio

[73] Assignee: Farmland Foods, Inc., Kansas, Mo.

[21] Appl. No.: 09/133,300

[22] Filed: Aug. 12, 1998

[51] Int. Cl.[6] .............................. A21D 10/02; A23B 4/00; A47J 23/00
[52] U.S. Cl. ..................... 426/112; 426/115; 426/129; 426/518; 426/641; 99/537; 99/538; 83/672; 83/733
[58] Field of Search ..................................... 426/112, 115, 426/129, 641, 518; 99/538, 537, 545, 576, 594, 595; 452/155, 160, 163; 83/672, 733

[56] References Cited

U.S. PATENT DOCUMENTS

| | | | |
|---|---|---|---|
| 4,386,560 | 6/1983 | Ditty | 99/538 |
| 4,821,635 | 4/1989 | Logan, Jr. | 99/538 |
| 5,089,286 | 2/1992 | Geissler et al. | 426/615 |
| 5,251,543 | 10/1993 | Brothers | 99/538 |

*Primary Examiner*—Nina Bhat
*Attorney, Agent, or Firm*—William B. Kircher; Shook, Hardy & Bacon, LLP

[57] ABSTRACT

A ham product which is formed by cutting a spirally sliced half ham longitudinally through the bone. The cut can be made by feeding the half ham through a band saw blade by hand, by pushing a split cart through the blade, or by feeding the product through the blade on a split belt conveyor. A special tray for packaging of the ham product has either a flap providing a double layer of material at the location of a sharp exposed corner of the femur or a plurality of cushioning dimples extruded at appropriate location thereon to pad the femur corner.

19 Claims, 5 Drawing Sheets

SPIRALLY SLICED HAM PRODUCT AND METHOD AND APPARATUS FOR PRODUCTION THEREOF

FIELD OF THE INVENTION

This invention relates in general to ham which is spirally sliced on the bone and deals more particularly with a spirally sliced ham which is cut transversely and then longitudinally to provide a ham product which is approximately one-fourth the size of a full ham. Additionally, the invention is directed to a method and apparatus for forming a ham product of this type, as well as to a unique packaging arrangement which involves packaging the ham product in a tray that is specially constructed to accommodate the sharp exposed corner of the ham bone.

BACKGROUND OF THE INVENTION

Spirally sliced hams have proven to be popular with consumers, largely because of the convenience of being able to easily remove the presliced ham pieces from the product at the point of use. The ham is produced by slicing it in a manner to form a continuous spiral cut around the center, often with the femur remaining in place but sometimes without a bone. In a "bone in" product, the meat remains continuously attached to the bone all the way around in a spiral pattern adjacent to the spiral cut. Thus, the meat remains connected to the bone firmly enough that the product can be handled and packaged intact without pieces falling off, folding over, or otherwise deforming. At the same time, the slices can be easily detached from the bone at the point of use.

It has been recognized that many consumers are hesitant to purchase an entire ham because there is more meat than the household of the purchaser can conveniently consume. As a result, spirally sliced hams are commonly sold at retail in half portions. The full ham is cut transversely through the femur in order to cut the product into a butt half and a shank half. The half that is adjacent to the butt end includes part of the femur and the aitch bone, while the half at the shank end of the product includes the rest of the femur and the shank bone. Both halves are commercially appealing in that only the ends of the femur are visible and the product is not unsightly. Also, the meat remains attached to the bone continuously completely around it, so slices are not prone to falling off or becoming deformed during subsequent handling and packaging.

Although spirally sliced ham products of this type have been well received, the amount of meat they contain is still excessive for smaller households and smaller occasions where the product is consumed by only a relatively small number of people. Consequently, there is the need to cut spirally sliced hams into smaller products in order to allow consumers the option of purchasing a smaller amount of meat. However, cutting the ham into smaller products presents significant problems which have not been overcome and such smaller spirally sliced ham products have not been commercially available.

SUMMARY OF THE INVENTION

The present invention has solved these problems through a unique method and apparatus that provides a unique ham product that is cut in a manner to make it available in an amount equal to approximately one-fourth of a full ham. At the same time, the product can be packaged in accordance with the present invention in a commercially attractive manner.

In accordance with the invention, a spirally sliced ham with the bone in place which has been cut transversely in half is cut again longitudinally through the femur. In accordance with different ways of carrying out this aspect of the invention, the product is cut by feeding it through a band saw blade either by pushing it manually through the blade along a table surface, or by feeding it through the blade on a special wheeled cart equipped with a split surface for accommodating the band saw blade, or by feeding it through the blade on a special split conveyor. For reasons of safety and production efficiency, the split conveyor is generally preferred for feeding of the product through a vertical band saw blade.

Whatever method is used involves aligning the femur with the saw blade so that the femur is cut longitudinally and the meat remains attached to the bone around approximately half of its original circumference. Even though the resulting one-fourth ham product is somewhat delicate, the slices remain attached to the bone securely enough to stay intact so that handling and packaging can be carried out in a commercially acceptable manner.

Another aspect of the invention involves the manner in which the product is packaged using a special tray. The tray has a flat bottom and a contour to receive either the butt or shank portions of the product with the face of the ham containing the cut femur resting on the bottom of the tray. Upstanding walls are provided on the tray to support the product around its entire perimeter.

It is an important feature of the invention that the corner area of the bone at the intersection between the transverse and longitudinal cuts is specially handled by the packaging. At the area where this sharp corner area fits into the tray, a series of cushioning dimples have been extruded at the edge of the tray to pad the bone. Consequently, conventional vacuum packaging can be applied without being punctured by the sharp corner of the bone. Alternatively, a folded flap may be provided on the tray thereby forming a double thickness of material which is able to resist puncturing of the tray.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
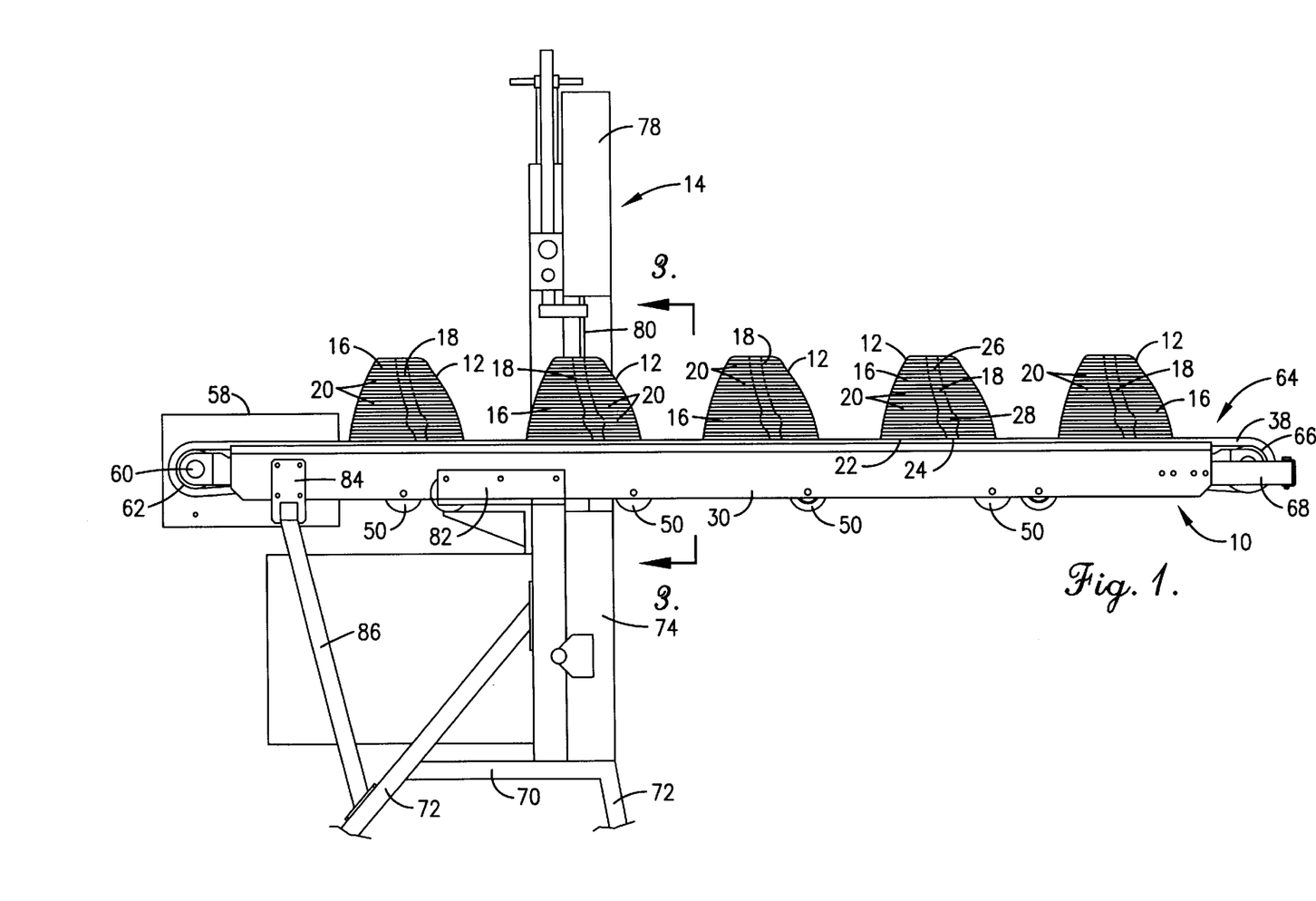
FIG. 1 is a side elevational view of a split conveyor system and band saw that may be used to effect a longitudinal cut through the bone and meat of a spirally cut half ham in accordance with a preferred embodiment of the present invention.
Figures 2, 3:
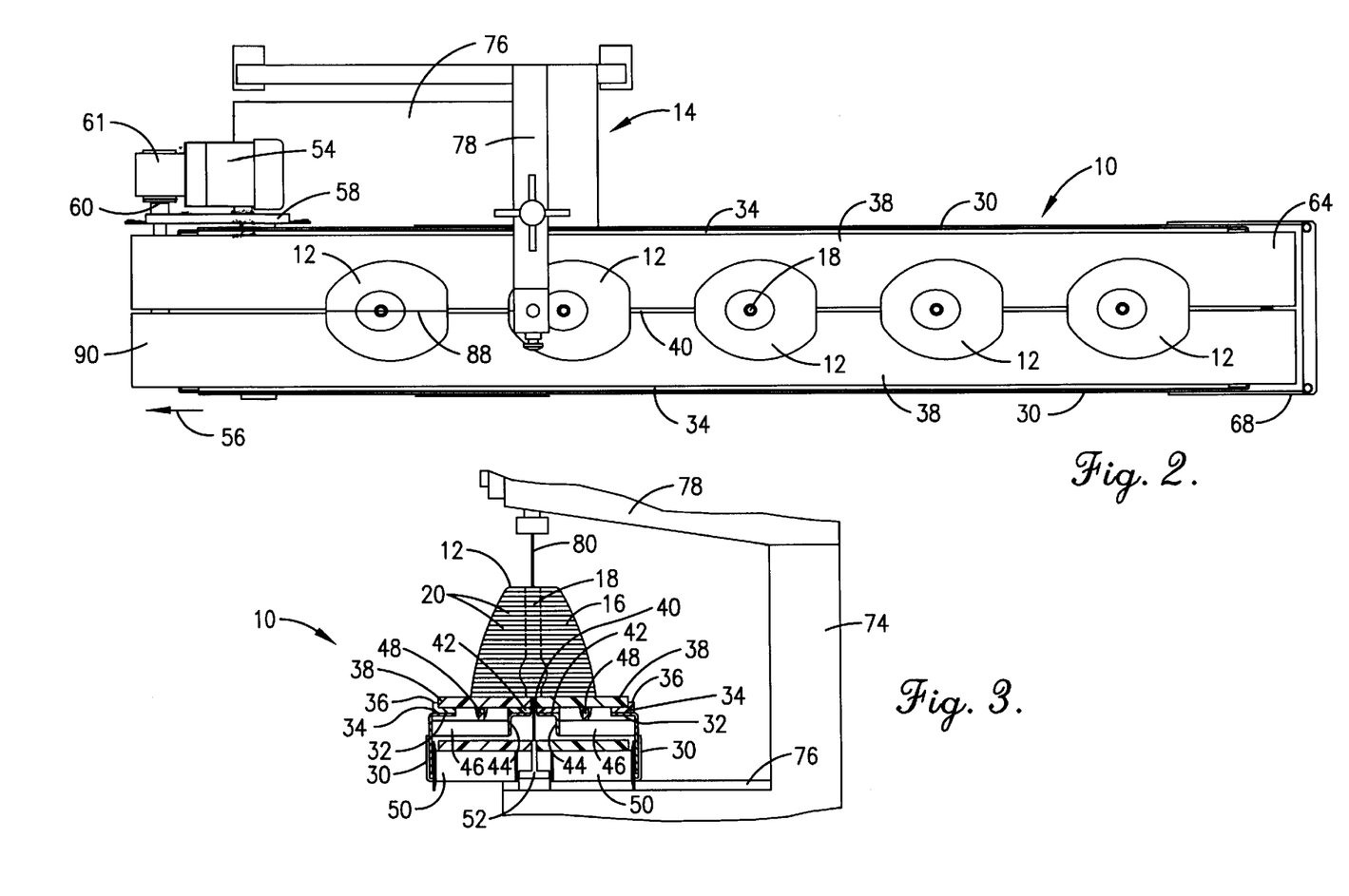
FIG. 2 is a top plan view of the conveyor and band saw shown in FIG. 1.
FIG. 3 is a fragmentary sectional view taken generally along line 3—3 of FIG. 1 in the direction of the arrows.

The present invention is directed to a novel ham product and to a method and apparatus for producing the product and packaging it. Referring initially to FIGS. 1–3, numeral 10 generally designates a split conveyor which is used to convey spirally sliced half hams 12 through a band saw which is generally identified by numeral 14. The half hams 12 may be either butt portions or the shank portions which are shown in the drawings. The half hams are formed conventionally by spirally slicing the meat 16 completely around the bone 18 in a continuous spiral cut to produce adjacent meat slices 20 which remain attached to the bone 18 completely around it in a spiral pattern. After the full ham has been spirally sliced in this manner, it is cut transversely to effect a transverse cut through the meat 16 and the bone 18. A substantially flat end face 22 is formed by the transverse cut. In the case of the shank half of the spirally cut ham shown in FIG. 1, the bone 18 includes part of the femur 24 and the shank bone 26 which is connected with the femur 24 at a joint 28. The flat cut end of the femur 24 is co-planar with the end face 22 and is visible in the half ham 12. In the case of a butt half, the half ham product has a bone which includes part of the femur and the aitch bone.

The conveyor 10 has a frame which includes parallel opposite sides 30 rigidly connected with one another. As best shown in FIG. 3, the top ends of the sides 30 are turned inwardly to provide flanges 32 on which L-shaped belt guides 34 are mounted. Each of the guides 34 has an upturned lip 36 on its outer end. The top surfaces of the guides 34 receives the outer edge portions of a pair of flexible, side by side conveyor belts 38 which provide conveyor surfaces for conveying the half hams 12 through the band saw 14. The lips 36 engage the outer edges of the belts 38 in order to properly guide the belts along the conveyor path defined by their movement on the conveyor 10. As best shown in FIG. 2, the belts 38 have their inside edges spaced slightly apart to provide a slit 40 in the center of the conveyor which extends along the longitudinal center line of the conveyor along the entire length of its upper run. The belts 38 are preferably constructed of a suitable food grade plastic.

With reference to FIG. 3, the inside edge portions of the conveyor belts 38 adjacent to the slit 40 ride on flat guide bars 42. The bars 42 are mounted on top of angle members 44 which form parts of the conveyor frame and which are connected by rigid bars 46 with the sides 30 of the conveyor. The center portion of each belt 38 rides on a friction rail 48. The rails 48 are mounted on bars 46 and provide flat upper surfaces on which the upper runs of the conveyor belts 38 travel.

The bottom or return runs of the belts 38 ride on top of rollers 50 which are mounted for rotation on the conveyor frame. The rollers 50 are mounted to rotate about horizontal axles which are supported on the frame sides 30 such that the lower runs of the belts ride on top of the rollers 50. The rollers 50 are spaced apart along the length of conveyor 10. The lower runs of the belts 38 are held slightly apart by a belt guide 52 having a vertical flange which extends into the space between the lower runs of the belts. The belt guide 52 is suitably mounted on the conveyor frame.

As best shown in FIG. 2, the conveyor belts 38 are driven by an electric motor 54 such that their upper conveying surfaces move in the direction indicated by the directional arrow 56. The motor 54 is mounted to the conveyor frame on a mounting plate 58 and drives a horizontal drive shaft 60 through a drive unit 61. The drive shaft 60 carries two spaced apart sprockets 62 (FIG. 1), one generally centered on each of the belts 38. The teeth of the sprockets 62 mate with complementary bars (not shown) on the interior surfaces of the conveyor belts 38 in order to provide a positive drive system for moving the belts 38 continuously at a constant speed when the conveyor is turned on. The input end 64 of the conveyor 10 opposite the motor 54 is provided with a pair of idler sprockets 66 (FIG. 1) around which the input ends of the belts 38 are drawn. There is one idler sprocket 66 for each of the belts 38. The sprockets 66 may be mounted for rotation on a separate frame 68 secured to the conveyor sides 30. Preferably, the idler sprockets 66 are adjustable in a manner to adjust the tension of the conveyor belts 38 through a conventional tensioning mechanism.

The band saw 14 may have a conventional construction. As shown in FIG. 1, a base 70 is provided with a plurality of legs 72 to provide a stand for supporting the band saw 14 on a floor or other surface. A vertical column 74 extends upwardly from the base 70 and provides a horizontal table 76 (see FIG. 3). An overhead arm 78 projects from the top of the column 74 and receives the upper portion of a conventional band saw blade 80. The blade 80 takes the form of a continuous looped member having teeth on its cutting edge and driven in a downward direction by a conventional drive mechanism (not shown) included in the band saw.

As previously indicated, the band saw 14 may have a conventional construction, and its manner of construction and operation are well known.

In accordance with the present invention, the conveyor frame is mounted to the band saw at a location such that the blade 80 moves downwardly in the space provided by the slit 40 between the two conveyor belts 38. The conveyor 10 extends generally along the table 76 and may be secured to the stand of the band saw by plates 82 secured to the conveyor sides 30. Additional plates 84 secured to the sides 30 have braces 86 projecting downwardly from them and connected with the legs 72 of the band saw stand. The conveyor 10 is thus mounted to the band saw with the upper runs of the belts 38 oriented horizontally and the band saw blade 80 moving downwardly through the slit 40 at a location intermediately between the opposite ends of the conveyor.

In operation of the conveyor 10, the half hams 12 are loaded in succession on the input end 64 of the conveyor, preferably by a human operator. The operator positions the hams 12 with the flat faces 22 on top of the conveyor surface provided by the belts 38 and with the bone 18 aligned with the slit 40. The rotative orientation of the hams 12 should be such that the femur 24 and shank bone 26 are oriented in a plane that is common with that of the flat band saw blade 80.

As the conveyor belts 38 move in the direction 56, the half hams 12 are conveyed through the band saw blade 80 in succession, and the blade 80 effects a cut through the half hams in a longitudinal plane perpendicular to the transverse plane that previously formed the cut resulting in the flat face 22 of each half ham. The blade 80 cuts longitudinally through the meat 16 and through the bone 18, thus cutting each half ham 12 into a pair of substantially mirror image products that are each approximately one-fourth of the full ham. The downward movement of blades 80 as it cuts the ham assists in holding the hams properly positioned on the conveyor surface.

By cutting longitudinally through the bone 18, the slices 20 remain attached to the bone around approximately one-half of its original diameter, thus maintaining the slices 20 intact and preventing them from falling off of the product as would be the case with a cut made other than through the bone 18. The cut made by the band saw blade 80 through each of the half hams 12 is indicated for one of the hams by numeral 88 in FIG. 2, and it is noted that the plane of this cut is perpendicular to the plane of the flat lower face 22 of the ham product.

After the half hams 12 have been cut in the manner indicated, the conveyor belts 38 convey them to a discharge end 90 of the conveyor. At the discharge end 90, the cut ham products may be manually removed from the conveyor, or they may be discharged from the conveyor and handled by other conveying systems or other equipment.

Figure 4:
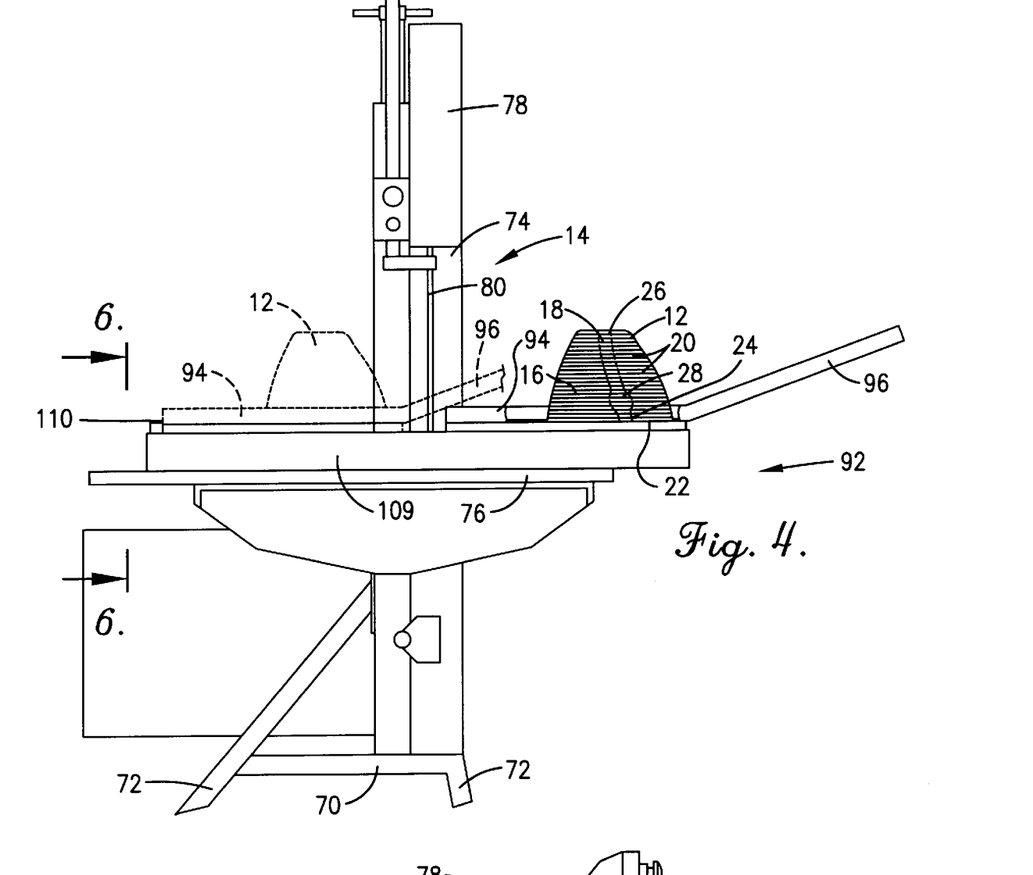
FIG. 4 is a side elevational view of a wheeled cart which may be used in combination with a band saw to effect a longitudinal cut through the bone and meat of a half ham in accordance with another embodiment of the present invention.
Figure 5:
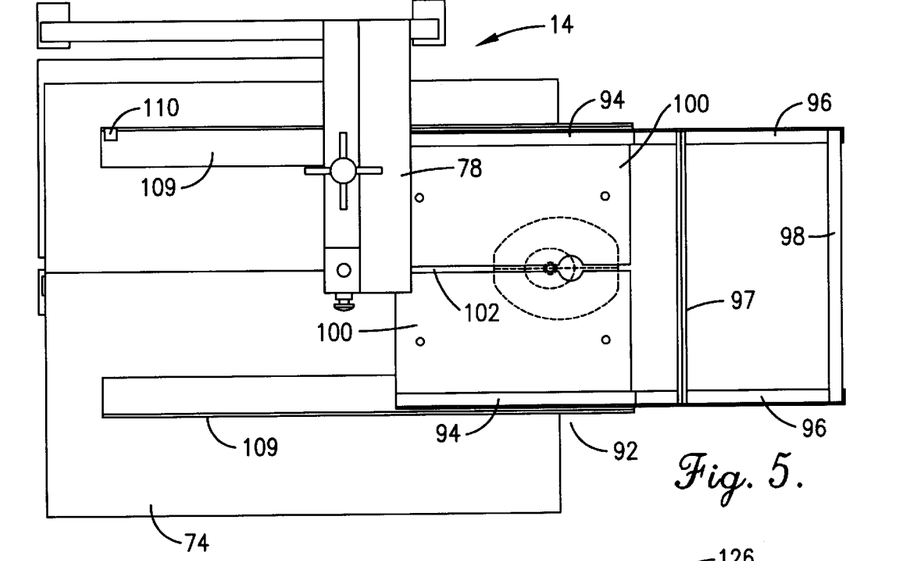
FIG. 5 is a top plan view of the band saw and cart shown in FIG. 4.
Figure 6:
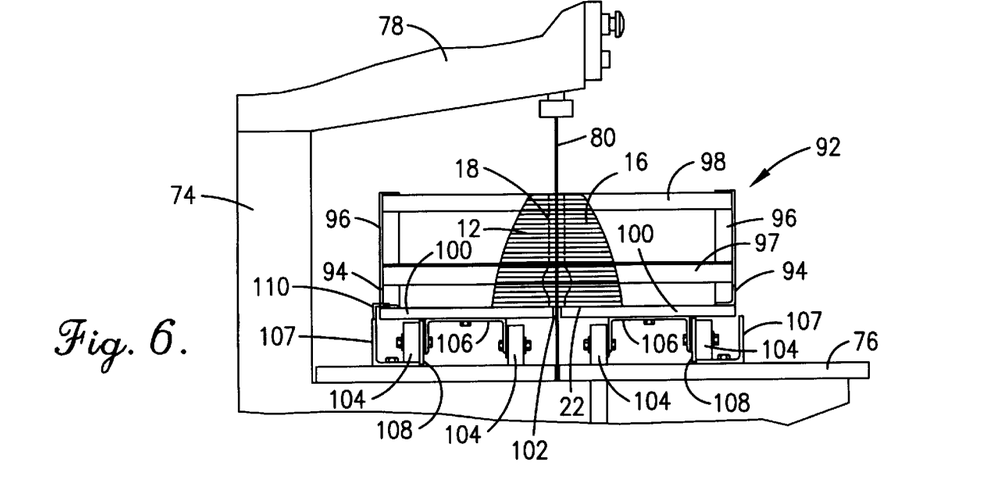
FIG. 6 is a fragmentary end elevational view taken generally along line 6—6 of FIG. 4 in the direction of the arrows.

FIGS. 4–6 illustrate an alternative way of producing ham products in accordance with the present invention. In the arrangement of FIGS. 4–6, the conveyor 10 is replaced by a wheeled cart which is generally identified by numeral 92 and which is used with the band saw 14. The cart 92 has a frame which includes a pair of angle members 94 on its opposite sides. The angle members 94 connect with a handle of the cart which includes opposite sides 96 extending rearwardly from the ends of the angles 94. A cross member 97 extends between and connects the handle sides 96 and assists in providing the cart with a rigid frame. A rear cross member 98 extending between sides 96 serves as a handle that may be gripped to move the cart 92 back and forth, as will be explained more fully.

The cart 92 includes a pair of flat plates 100 which are secured to the undersides of the angle members 94. The plates 100 occupy a common horizontal plane and provide on their upper surfaces a horizontal surface for receiving the ham halves 12. The inside edges of the plates 100 are spaced apart slightly to present a narrow slit 102 between the plates.

Each of the plates 102 is provided on its underside with sets of wheels 104, including a pair of front wheels and a pair of back wheels. The wheels 104 in each pair are mounted on a bracket 106 which is secured to the underside of the plate 100.

The wheels 104 roll along the upper surface of the band saw table 76 and may be guided along a prescribed path by rails 107. The rails 107 may take the form of parallel angle members which are spaced apart and secured to the table 76. Preferably, the outside wheel 104 in each pair of wheels is provided with a flange 108 which butts up against the inside edge of the lower flange of each rail 107 in order to guide the cart 92 along a straight path defined by the guide rails 107. The rails 107 are spaced apart on opposite sides of the band saw blade 80.

In use, the ham halves 12 are loaded one at a time onto the plates 100 with the cart 92 in the retracted position shown in FIG. 5 and in solid lines in FIG. 4. In this position, the cart 92 is backed away from the band saw blade, and the ham half 12 can be loaded onto the cart without the operator's hands being in the vicinity of the blade 80. The ham half 12 is loaded onto the cart with the flat face 22 located flatly on top of the plates 100 and with the bone 18 aligned with the slit 102. The femur 24 and shank 28 should be located in the same plane as the flat band saw blade 80.

After the ham has been loaded onto cart 92 in this manner, the handle member 98 is used to push the cart by hand forwardly to the position shown in broken lines in FIG. 4. The wheels 104 roll along the rails 107 such that the cart is guided to assure that the band saw blade 80 is received in and moves through the slit 102. The ham product 12 is thus cut longitudinally through the bone 18 in substantially the same manner as in the case of the conveyor 10. One or both of the rails 107 may be provided on its forward end with a stop 110 which prevents the cart 102 from moving beyond the position shown in broken lines in FIG. 4. This assures that the hands of the operator pushing the cart will not move into the vicinity of the blade 80 and that the cross members 97 will not move into the blade.

After the cart has reached the position shown in broken lines in FIG. 4 and the ham has been cut longitudinally, the ham may be removed from the cart 92, either by hand or otherwise. After the cut ham has been unloaded from the cart, the cart may be pulled backwardly to the position shown in FIG. 4 where it is located to receive another ham that is to be cut.

It is noted that removal of the hams is necessary when the cart 92 is used, and that this may involve the hands of the operator being in the vicinity of the blade 80. In contrast, the discharge end 90 of the conveyor 10 is well removed from the band saw blade and is thus safer in operation. In addition, the use of the cart 92 involves cutting the hams one at a time and manually reciprocating the cart back and forth. The conveyor 10 operates more efficiently for production purposes in that the hams are conveyed and cut successively in a mass production technique. For these reasons, the conveyor 10 is generally preferable over the cart 92, although the cart 92 can be used effectively in some applications.

The present invention also contemplates feeding of the ham halves 12 through the band saw blade 80 by hand. Each ham half 12 may be positioned on the table 76 with the flat face 22 on the table and the bone 18 aligned with the blade 80. With the hands of the operator located on opposite sides of the ham halves 12 and on opposite sides of the blade 80, the ham may be slid by hand through the blade 80 in order to make the same longitudinal cut through the ham half as occurs with the conveyor 10 or the cart 92. While hand feeding of the hams in this fashion can be carried out, there are some obvious safety problems and efficiency problems associated with a manual operation of this type, and use of the conveyor or cart is generally preferred. Nevertheless, it is possible to produce the ham product of the present invention through the use of a manual operation.

Figures 7, 8, 9:
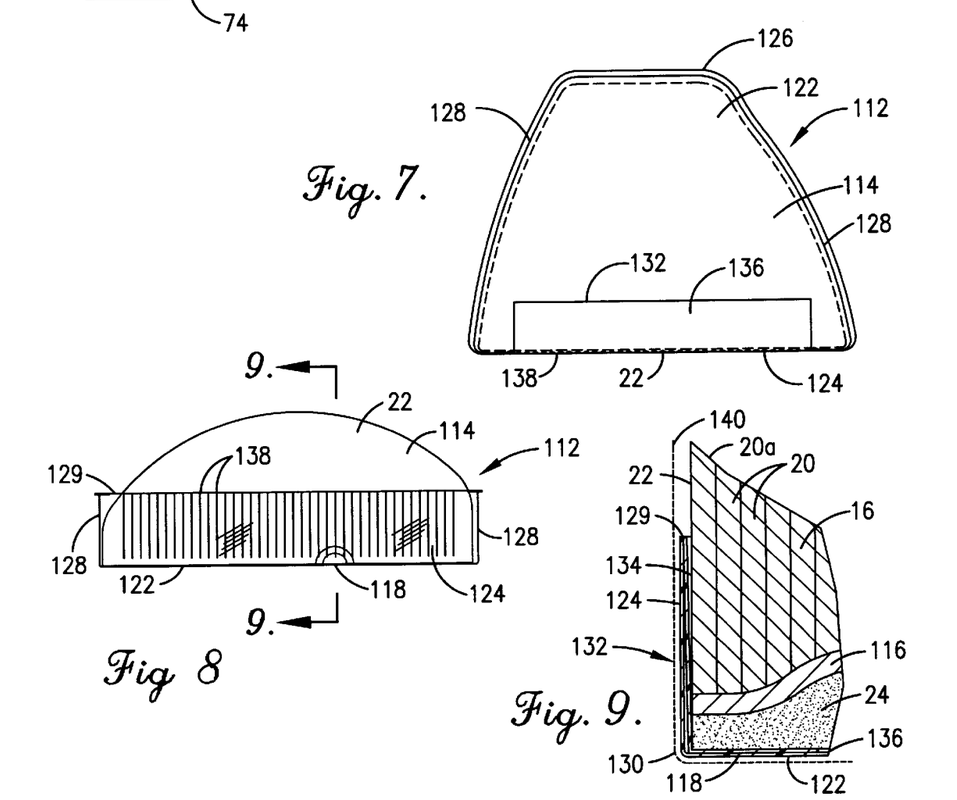
FIG. 7 is a top plan view of a tray which may be used in the packaging of a ham product formed in accordance with the present invention.
FIG. 8 is a front elevational view of the tray shown in FIG. 7.
FIG. 9 is a fragmentary sectional view on an enlarged scale taken generally along line 9—9 of FIG. 8 in the direction of the arrows, with vacuum packaging material shown in broken lines.
Figure 10:
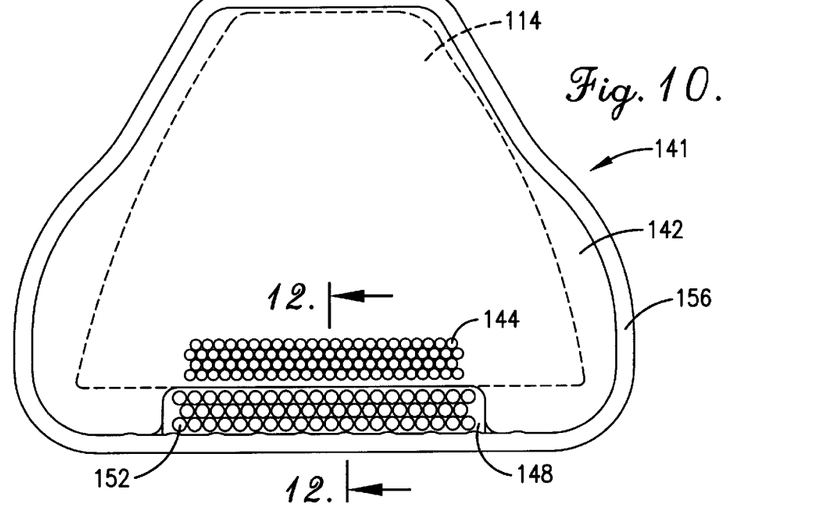
FIG. 10 is a top plan view of another embodiment of a tray which also may be used in the packaging of a ham product formed in accordance with the present invention.
Figure 11:
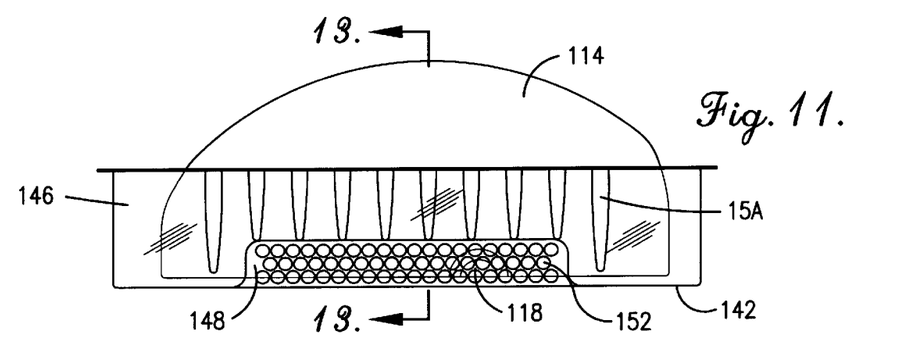
FIG. 11 is a front elevational view of the tray shown in FIG. 10.
Figure 12:
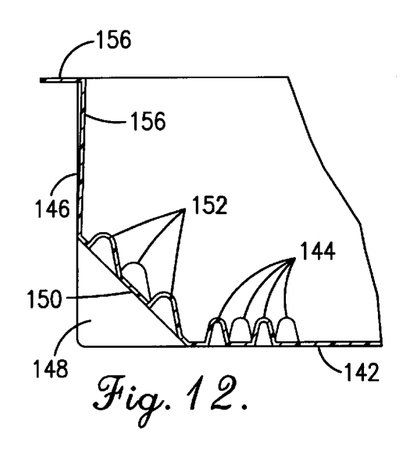
FIG. 12 is a fragmentary sectional view on an enlarged scale taken generally along the line 12—12 of FIG. 10 in the direction of the arrows.
Figure 13:
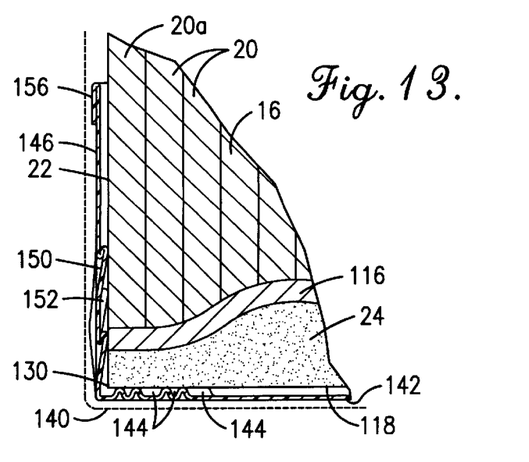
FIG. 13 is a fragmentary sectional view taken generally along the line 13—13 in the direction of the arrows, with the vacuum packaging material shown in broken lines.

Referring now to FIGS. 7–9, numeral 112 generally identifies a tray which may be used in the packaging of the ham product of the present invention. Numeral 114 designates the one-fourth ham product which is produced by longitudinally cutting one of the half hams 12. The end of that part of the femur 24 which remains after the product has been cut into approximately one-fourth of a ham is exposed on the flat surface 22. As shown in FIG. 9, the ham slices 20 of the meat 16 remain connected with the portion of the bone that remains and are attached thereto by connective tissue 116. The longitudinal cut provides an exposed flat surface 118 on the femur 24.

The tray 112 may be constructed of a suitable food grade plastic. The tray 112 has a flat bottom 122 having a contour to receive the product 114 whether it is part of the butt portion or the shank portion of the ham product. Extending upwardly from the outer edge of the bottom 122 along its entire perimeter is a wall which includes a relatively long front wall portion 124 and a shorter back wall portion 126. The flat face 22 is adjacent to the front wall 124 when the ham product is packaged. Curved side walls 128 extend between the front and back walls 124 and 126. The tray 112 is open at the top, with the walls terminating in an upper edge 129.

The ham product 114 may be inserted into the tray 112 with the longitudinally cut face of the product located on the flat bottom 122 of the tray and with the product fitting within the walls 124, 126, and 128. The femur 124 has a sharp corner 130 (see FIG. 9) which is exposed and which is located at the intersection between the transverse cut and the longitudinal cut. The corner 130 is located intermediately along the front wall 124.

In order to prevent the tray 112 from being punctured by the sharp corner 130, the tray is provided with an L-shaped flap 132 which is attached to the upper edge of the front wall 124. The flap 132 includes a front panel 134 which extends downwardly from the upper edge of wall 124 along the majority of its length. The panel 134 extends along the inside surface of wall 124 to provide a double layer of material at that location which enhances the strength of the front wall of the tray.

The flap 132 further includes a bottom panel 136 which extends from the lower edge of the front panel 134 along the upper surface of the tray bottom 122. The flap 132 may be formed as a part of the tray 112 and is preferably constructed of the same material as the tray.

The front wall 124 of the tray is preferably further strengthened by providing it with a plurality of pleats 138.

When the ham product 114 is inserted into the tray 112, the sharp corner 130 of the femur 24 is located on the flap 132 with the flat bone surface 118 lying on top of panel 136 and the end of the femur 24 butting against the panel 134. The panels 134 and 136 provide a double thickness of the tray at the critical area where the sharp corner 130 is located and thus enhance the strength of the tray at this important location and prevent the sharp corner 130 from puncturing the tray.

FIGS. 10–13 represent another embodiment of the tray and packaged ham product shown in FIGS. 7–9. In this embodiment the flap 132 may be eliminated and of a series cushioning dimples utilized in place thereof. Since much of the tray 141 is identical to the tray 112, only the relevant differences are described and depicted herein.

As shown in FIGS. 10–13, the tray bottoms 142 has four rows of dimples 144 which have been extruded therein and which extend vertically upwardly (FIG. 12) therefrom near the front wall 146. In actual construction front wall 146 includes a substantially rectangular inset area 148 with an angled wall 150 therein. Slightly larger dimples 152, comprised within several (three) rows, are shown as having been extruded from the angled wall 150 and likewise extend inwardly from front wall 146. For strengthening purposes, front wall 146 has pleats 154 located therein functioning similarly to the pleats 138 (FIG. 8). Inset area 148 (and dimples 152) is in the lower half of front wall 146 generally below most of the pleats 154.

Both rows of cushioning dimples 144 and 152 are centered on the tray bottom 142 and front wall 146 respectively, and are of a sufficient length to accommodate placement of either a right or left (butt or shank) portion of the ham product. Lip 156 circumscribes the upper periphery of tray 141 and is flexible and of a similar gauge plastic material to that of the tray.

As suggested above with respect to tray 112, when the ham product 114 is placed in tray 141, the sharp corner 130 of femur 24 is located on dimples 144 which, due to their flexibility invert or compress upon themselves as a result of the weight of the ham product and the compressive force of the vacuum packaging material 140. The substantially flat face 22 of the ham product is also forced in contact with dimples 152 which causes same to flexibly compress thereby increasing the thickness of the surface area (contacting the femur 24) as the packaging material 140 is drawn snugly about the entire package, including ham product and tray. Correspondingly, lip 156 bends over within the package, and angled wall 150 assumes a substantially vertical orientation as shown in the transition from its initially placed position in FIG. 12 to the vacuum packed position in FIG. 13.

With the product 114 located in the tray 112 (or tray 141), the tray and product are packaged in standard plastic vacuum packaging material 140 (FIGS. 9 and 13) which may be applied using conventional vacuum packaging techniques as suggested above. It is noted that the enhanced strength and protection provided by either of the trays 112 and 141 assists in maintaining the product 114 intact and holds the face slice 20a (see FIGS. 9 and 13) on the product. For this respect, it is noted that the other slices 20 are all surrounded by other slices which help to maintain them in place. Thus, the face slice 20a is a more delicate part of the product and is prone to falling off or folding on itself. The reinforcing flap 132 in one embodiment and the cushioning dimples (144 and 152) in another embodiment prevent the sharp corner 130 from puncturing the vacuum packaging material 140 and thus possibly causing the product to leak fluids.

It is thus apparent that the present invention provides a new ham product which can be formed in accordance with the invention by effecting a longitudinal cut through a spirally sliced ham half 12 which has already been transversely cut. In addition, the invention provides a method and apparatus for producing the unique ham product and also makes use of the novel trays 112 or 141 for packaging of the product in a commercially acceptable manner that makes it appealing to consumers.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A ham product comprising meat arranged in slices on a bone with the meat and bone being cut along a transverse plane extending transversely through the bone and meat and along a longitudinal plane extending longitudinally through the bone and meat.

2. A ham product formed from a ham having a bone surrounded by meat by spiral slicing the meat around the bone, transversely cutting through the bone and meat along a plane oriented generally transverse to the bone, and longitudinally cutting through the bone and meat along a plane oriented generally longitudinal to the bone.

3. A ham product formed from a ham piece that includes a ham bone which is surrounded by meat spirally sliced around the bone and which has been transversely cut along with the meat, said product being formed by effecting a cut longitudinally through the bone and meat of said ham piece.

4. A method of processing a ham comprising the steps of:
   spirally slicing meat on a ham bone;
   cutting transversely through the bone and meat along a plane oriented generally transverse to the bone; and
   cutting longitudinally through the bone and meat along a plane oriented generally longitudinal to the bone.

5. A method as set forth in claim 4, wherein:
   said step of cutting transversely results in a ham product having a substantially flat surface; and
   said step of cutting longitudinally comprises locating said ham product on a support surface with said flat surface on the support surface and the bone aligned with a vertical saw blade and feeding said ham product through said blade on the support surface.

6. A method as set forth in claim 5, wherein said step of cutting longitudinally comprises feeding said ham product by hand through said blade along the support surface.

7. A method as set forth in claim 4, wherein:
   said step of cutting transversely results in a ham product having a substantially flat surface; and
   said step of cutting longitudinally comprises locating said ham product on a conveyor surface with said flat surface on the conveyor surface and the bone aligned with a vertical saw blade and moving said conveyor surface toward the saw blade to feed the ham product through the blade.

8. A method as set forth in claim 4, wherein:
   said step of cutting transversely results in a ham product having a substantially flat surface; and
   said step of cutting longitudinally comprises locating said ham product on a wheeled cart with said flat surface on the cart and the bone aligned with a vertical saw blade and rolling the cart toward the saw blade to feed the ham product through the blade.

9. Apparatus for cutting a ham product having a bone and meat on the bone spirally sliced thereon, said apparatus comprising:
   a conveyor presenting a generally horizontal conveyor surface driven along a prescribed conveyor path for holding and conveying the ham product with the bone oriented generally vertically, said conveyor surface presenting a slit therein with which the bone may be aligned; and
   a vertically oriented saw blade operating in said slit and positioned therein along said conveyor path for effecting a cut longitudinally through the bone and meat when the ham product is conveyed past said blade on the conveyor surface.

10. Apparatus as set forth in claim 9, wherein said conveyor comprises a pair of side by side conveyor belts cooperating to provide said conveyor surface and spaced apart to present said slit therebetween.

11. A packaged food article comprising:
    a processed ham product having a bone with meat thereon arranged in slices and the bone and meat cut transversely and longitudinally to present a sharp exposed corner area of the bone;
    a tray holding said ham product and including a bottom and a peripheral wall cooperating to provide an open container in which the ham product is received with said corner area of the bone located adjacent to an intersection between said bottom and a selected portion of said wall;
    means for providing an enhanced strength area adjacent to said intersection to resist puncturing of the tray by said corner area of the bone; and
    flexible packaging enclosing said ham product and tray.

12. A packaged food article as set forth in claim 11, wherein said means for providing an enhanced strength area comprises an area of increased thickness there compared to the thickness of the remainder of said tray.

13. A packaged food article as set forth in claim 11, wherein said means for providing an enhanced strength area comprises a flap on said tray extending adjacent to said intersection.

14. A packaged food article as set forth in claim 11, wherein said means for providing an enhanced strength area comprises a flap extending along said selected wall portion and along said bottom adjacent to said intersection.

15. A packaged food article as set forth in claim 14, including a plurality of pleats on said selected wall portion.

16. A packaged food article as set forth in claim 11, wherein said means for providing an enhanced strength area comprises a cushioning dimple on said wall portion and/or said bottom adjacent to said intersection.

17. A packaged food article as set forth in claim 16, including a plurality of said dimples on one of said wall portion and said bottom.

18. A packaged food article as set forth in claim 17, including a plurality of said dimples on both said wall portion and said bottom.

19. A packaged food article as set forth in claim 17, wherein said dimples are centered on one of said wall portion and said bottom.

* * * * *